(12) United States Patent
Kluck et al.

(10) Patent No.: US 11,566,698 B1
(45) Date of Patent: Jan. 31, 2023

(54) AXLE ASSEMBLY HAVING A DAM AND A LUBRICANT RESERVOIR

(71) Applicant: ArvinMeritor Technology, LLC, Troy, MI (US)

(72) Inventors: Rob Kluck, Troy, MI (US); Matthew J. Corrion, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 17/860,200

(22) Filed: Jul. 8, 2022

(51) Int. Cl.
*F16H 57/04* (2010.01)
*F16H 57/037* (2012.01)
*F16H 57/02* (2012.01)

(52) U.S. Cl.
CPC ....... *F16H 57/0423* (2013.01); *F16H 57/037* (2013.01); *F16H 57/0483* (2013.01); *F16H 2057/02052* (2013.01)

(58) Field of Classification Search
CPC ............... F16H 57/0423; F16H 57/037; F16H 57/0483; F16H 2057/02052
See application file for complete search history.

(56) References Cited

U.S. PATENT DOCUMENTS

| 8,974,342 | B2 | 3/2015 | Kwasniewski et al. |
| 9,677,661 | B2 | 6/2017 | Bodary |
| 10,036,467 | B2 | 7/2018 | Keane et al. |
| 10,161,502 | B2 | 12/2018 | Kwasniewski et al. |
| 10,167,944 | B2 | 1/2019 | Kwasniewski et al. |
| 2017/0045126 | A1* | 2/2017 | Kluck ..................... F16D 11/10 |
| 2020/0047613 | A1* | 2/2020 | Eschenburg ............ F16H 48/38 |

FOREIGN PATENT DOCUMENTS

| DE | 710894 C | 9/1941 |
| EP | 1375970 A2 | 1/2004 |
| JP | S5937462 U | 3/1984 |
| JP | 2012210839 A | 11/2012 |

\* cited by examiner

*Primary Examiner* — Colby M Hansen
(74) *Attorney, Agent, or Firm* — Brooks Kushman PC (57) ABSTRACT

An axle assembly having an axle housing, a dam, and a fastener. The dam is disposed in the axle housing and retains lubricant in an arm portion of the axle housing. The fastener that extends from the axle housing and engages a dam mounting feature of the dam to secure the dam to the axle housing.

20 Claims, 5 Drawing Sheets

AXLE ASSEMBLY HAVING A DAM AND A LUBRICANT RESERVOIR

TECHNICAL FIELD

This relates to an axle assembly having a dam and a lubricant reservoir.

BACKGROUND

An axle assembly having a dam is disclosed in U.S. Pat. No. 10,167,944.

SUMMARY

In at least one configuration, an axle assembly is provided. The axle assembly includes a housing assembly, a dam, and a first fastener. The housing assembly includes an axle housing. The axle housing has a center portion and an arm portion. The arm portion extends from the center portion and is adapted to receive an axle shaft. The dam is disposed in the axle housing and cooperates with the arm portion to define a reservoir that retains lubricant in the arm portion. The dam has a dam panel, a brace, and a dam mounting feature. The dam panel extends from the arm portion. The brace extends from the dam panel into the center portion. The dam mounting feature is fixedly disposed on the brace. The first fastener extends from the axle housing and engages the dam mounting feature to secure the dam to the axle housing.

The housing assembly may include a differential carrier. The differential assembly may be rotatably disposed upon the differential carrier. The differential carrier may be mounted to the axle housing with the first fastener.

The axle housing may have a first side wall. The first side wall may define a first opening through which the differential assembly may extend. The axle housing may have a second side wall. The second side wall may be disposed opposite the first side wall. The second side wall may define a second opening. The axle housing may have a bowl cover. The bowl cover may be fixedly disposed on the second side wall. The bowl cover may cover the second opening. The first fastener may extend from the first side wall. The first fastener may be spaced apart from the second side wall.

The axle housing may have a mounting ring. The mounting ring may be fixedly disposed on the first side wall. The mounting ring may at least partially define the first opening.

A nut may be disposed on the first fastener. The nut may engage the first side wall to inhibit removal of the first fastener from the axle housing. The nut may be spaced apart from the dam.

The first fastener may extend through a fastener hole in the first side wall. The first fastener may extend through a fastener hole in the mounting ring.

The dam mounting feature may encircle the first fastener. The dam mounting feature may be spaced apart from the dam panel. The dam mounting feature may be spaced apart from the axle housing.

The differential assembly may be disposed in the center portion of the axle housing. The center portion may have a sump portion that receives lubricant. The differential assembly may have a ring gear.

The axle assembly may include a lubricant conduit. The lubricant conduit may capture lubricant that is dispersed by the ring gear of the differential assembly. The lubricant conduit may be positioned closer to the first side wall of the axle housing than the brace of the dam is positioned to the first side wall.

The lubricant conduit may have a trough. The trough may direct lubricant to the arm portion. The lubricant conduit may have a conduit mounting feature. The conduit mounting feature may be disposed proximate the trough. A second fastener may extend from the axle housing. The second fastener may engage the conduit mounting feature to mount the lubricant conduit to the axle housing. The differential carrier may be mounted to the second fastener. The conduit mounting feature may encircle the second fastener. A stem may extend from the conduit mounting feature to the trough.

The second fastener may extend from the first side wall of the axle housing toward the second side wall of the axle housing. The second fastener may be spaced apart from the second side wall.

The first fastener and the second fastener may each have an end that is disposed inside the axle housing. The end of the second fastener may be disposed further from the second side wall than the end of the first fastener is disposed from the second side wall.

A first nut may be disposed on the second fastener. The first nut may inhibit movement of the second fastener with respect to the axle housing. The first nut may engage the conduit mounting feature. The first nut may extend between the conduit mounting feature and the first side wall.

A second nut may be disposed on the second fastener. The second nut may be disposed on an opposite side of the conduit mounting feature from the first nut. The second nut may engage the conduit mounting feature. The second nut may inhibit movement of the lubricant conduit with respect to the second fastener.

DETAILED DESCRIPTION

As required, detailed embodiments of the present invention are disclosed herein. It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
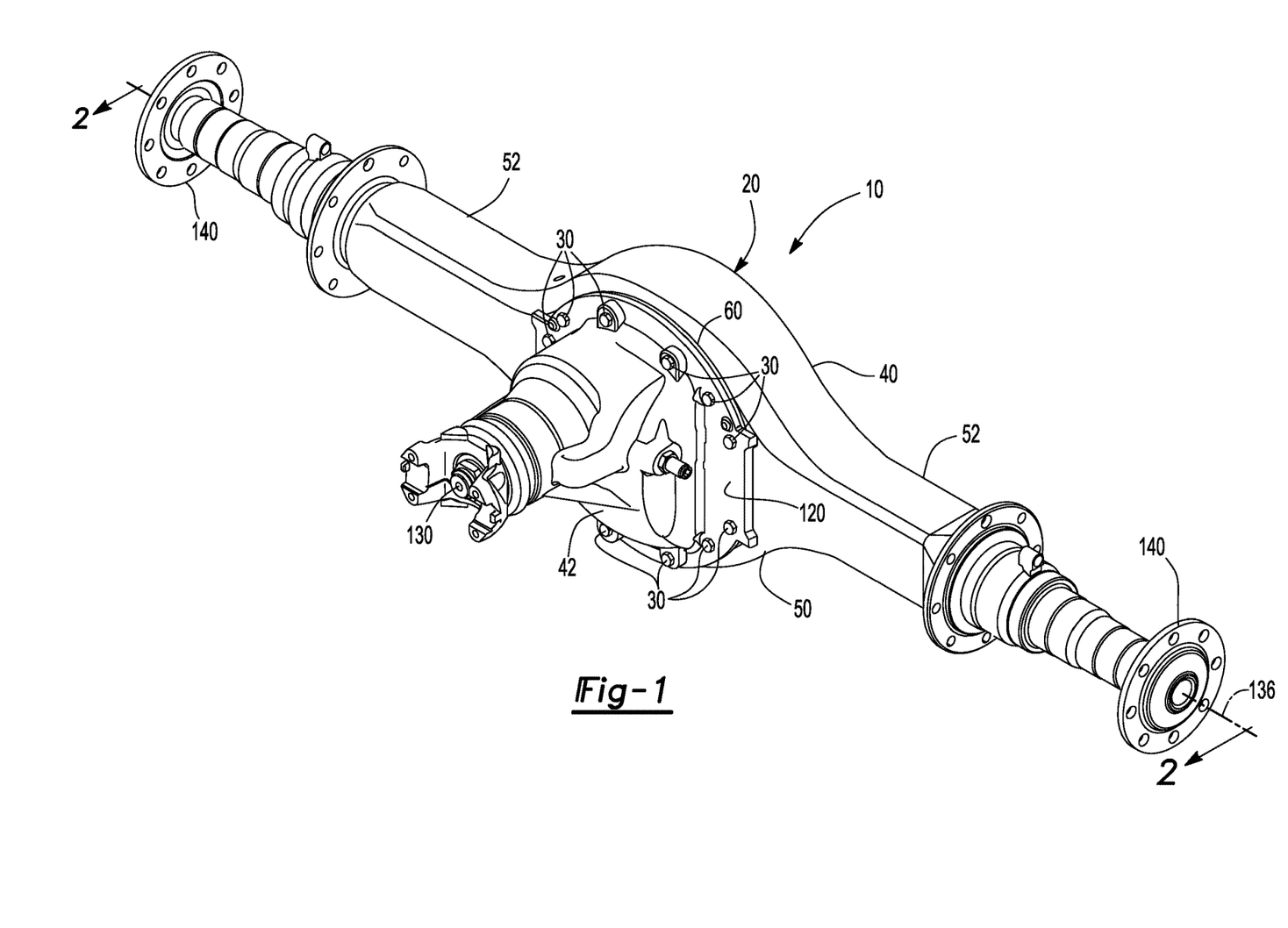
FIG. 1 is a perspective view of an example of an axle assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

Figure 2:
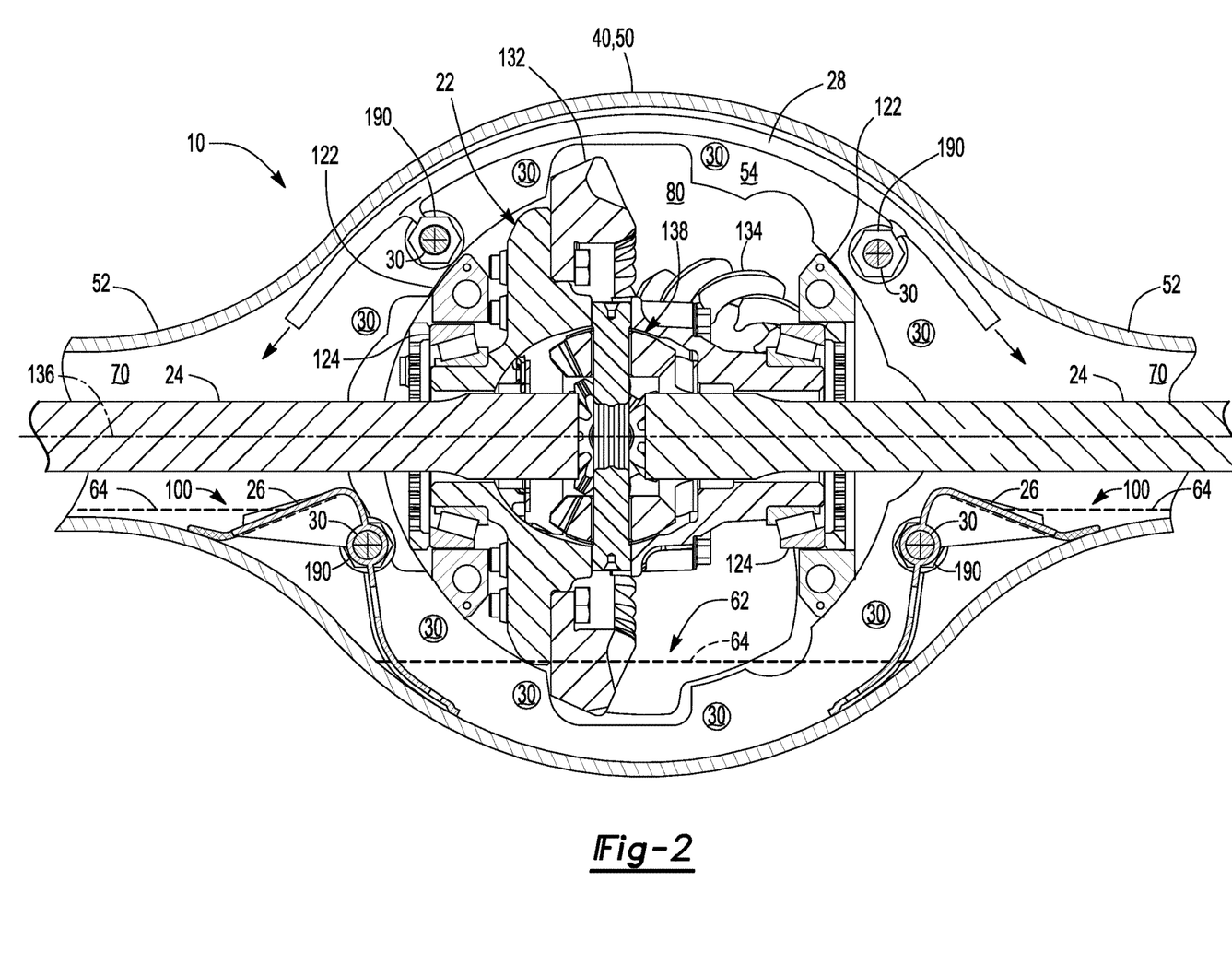
FIG. 2 is a section view of the axle assembly along section line 2-2.

The axle assembly 10 is part of a vehicle drivetrain that may provide torque to one or more traction wheel assemblies that may include a tire mounted on a wheel. The axle assembly 10 may be operatively connected to at least one torque source, such as an electric motor or an internal combustion engine. One or more axle assemblies 10 may be provided with the vehicle. For example, the axle assembly 10 may be a single drive axle assembly or may be configured as part of a tandem axle configuration or multi-axle configuration that may include a plurality of axle assemblies that may be connected in series. As is best shown with reference to FIG. 1, the axle assembly 10 includes a housing assembly 20. As is best shown in FIG. 2, the axle assembly 10 also includes a differential assembly 22, at least one axle shaft 24, at least one dam 26, or combinations thereof. The axle assembly 10 may also include a lubricant conduit 28 and a set of fasteners 30.

Referring to FIGS. 1 and 2, the housing assembly 20 receives various components of the axle assembly 10. In addition, the housing assembly 20 may facilitate mounting of the axle assembly 10 to the vehicle. The housing assembly 20 includes an axle housing 40 and a differential carrier 42.

Figure 4:
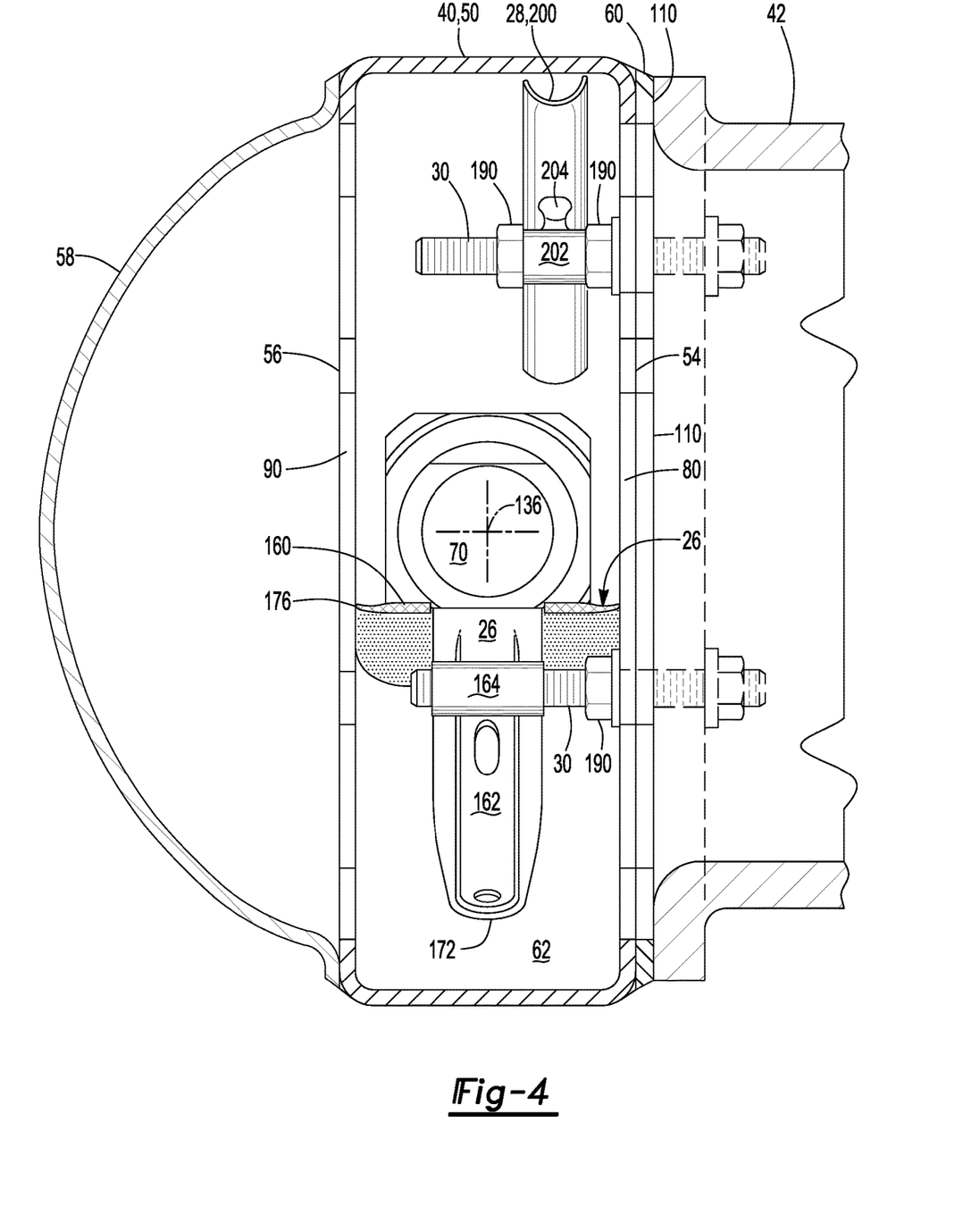
FIG. 4 is a section view of the axle assembly along section line 4-4.

The axle housing 40 receives and support the axle shafts 24. In at least one configuration, the axle housing 40 includes a center portion 50 and at least one arm portion 52. As is best shown in FIG. 4, the axle housing 40 may include a first side wall 54, a second side wall 56, a bowl cover 58, a mounting ring 60, or combinations thereof.

Referring to FIG. 2, the center portion 50 is disposed proximate the center of the axle housing 40. The center portion 50 may define a cavity that may receive the differential assembly 22 and at least a portion of the dam 26. A region of the center portion 50 or cavity that is located below the differential assembly 22 may at least partially define a sump portion 62 that may contain lubricant 64. Lubricant 64 may be dispersed (e.g., flung, splashed, sprayed) by one or more rotating components disposed inside the axle housing 40, such as the differential assembly 22 and its ring gear 132. Dispersed lubricant 64 may flow down the sides of the center portion 50 and may flow over internal components of the axle assembly 10 and gather in the sump portion 62 if not otherwise redirected.

The lubricant 64, which may be a liquid such as oil, may lubricate components of the axle assembly 10, such as the differential assembly 22 and various bearings. In FIG. 2, the level of the lubricant 64 in the arm portions 52 and the sump portion 62 is represented by the dashed lines. The lubricant levels are merely exemplary and may be higher or lower than what is depicted.

Referring to FIGS. 1 and 2, one or more arm portions 52 extend from the center portion 50. For example, two arm portions 52 may extend in opposite directions from the center portion 50 and away from the differential assembly 22. The arm portions 52 may have similar configurations. For example, the arm portions 52 may each have a hollow configuration or tubular configuration that may extend around and receive a corresponding axle shaft 24 and may help separate or isolate the axle shaft 24 from the surrounding environment. An arm portion 52 or a portion thereof may be integrally formed with the center portion 50. Alternatively, an arm portion 52 may be separate from the center portion 50. In such a configuration, each arm portion 52 may be attached to the center portion 50 in any suitable manner, such as by welding or with one or more fasteners. As is best shown in FIG. 2, each arm portion 52 may define an arm cavity 70 that may receive a corresponding axle shaft 24. The arm portion 52 and arm cavity 70 may be disposed above the sump portion 62 in one or more embodiments.

Figure 3:
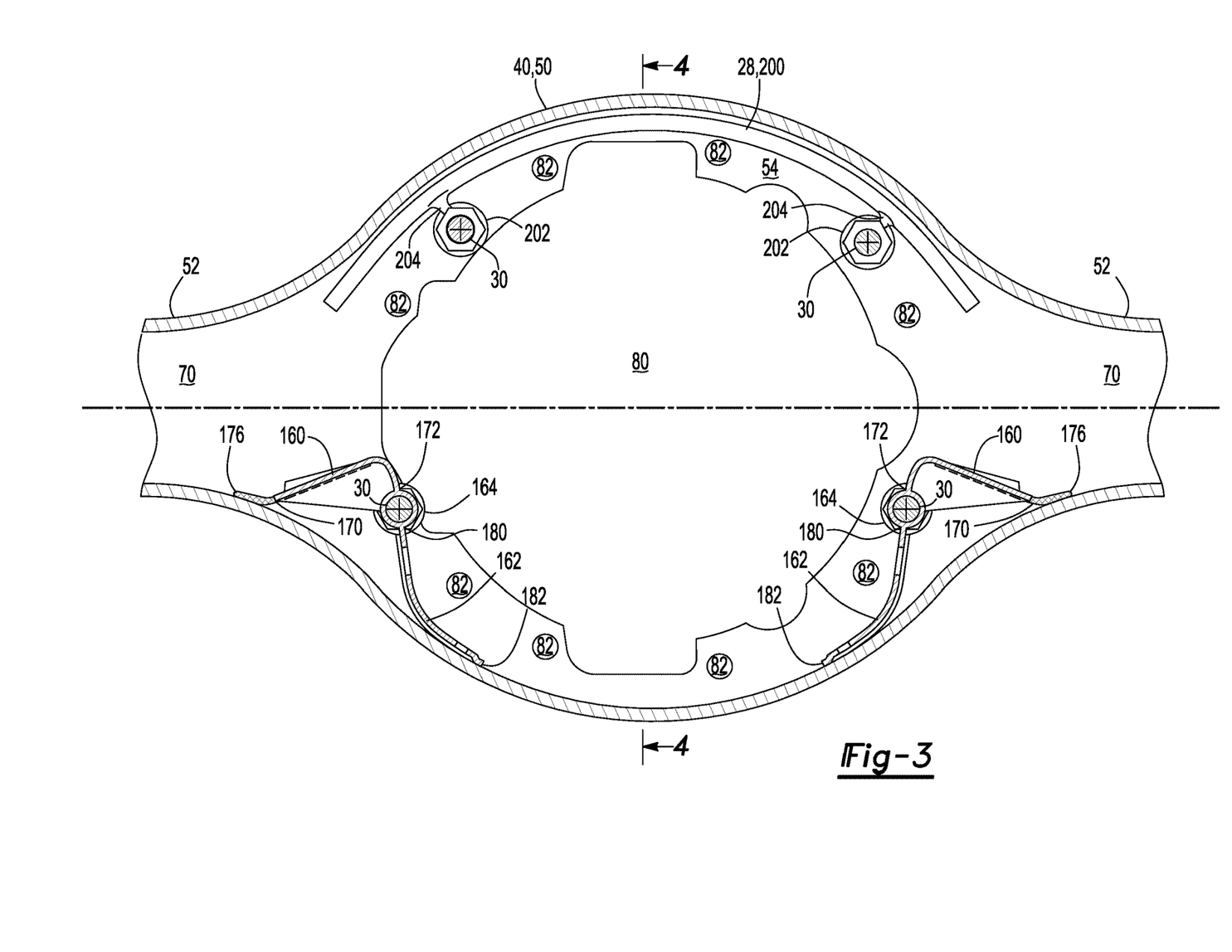
FIG. 3 is the axle assembly shown in FIG. 2 with various components omitted for clarity, such as the axle shafts, the differential assembly, and the differential carrier.

Referring primarily to FIGS. 2 and 4, the first side wall 54 is disposed on a side of the axle housing 40 that faces toward and is disposed proximate the differential carrier 42. For instance, the first side wall 54 may engage or contact the mounting ring 60. The first side wall 54 may define a first opening 80 through which the differential assembly 22 and a portion of the differential carrier 42 may extend when the differential assembly 22 is mounted to the axle housing 40. As is best shown in FIG. 3, the first side wall 54 may include a set of fastener holes 82 that may be aligned with corresponding holes on the differential carrier 42, the mounting ring 60, or both. Each hole may receive a fastener 30. The fasteners 30 may couple the differential carrier 42 to the axle housing 40. Some fasteners 30 may also couple another component to axle housing 40. For instance, a fastener 30 may also mount a dam 26 to the axle housing 40 or couple the lubricant conduit 28 to the axle housing 40 as will be discussed in more detail below. The fastener 30 may have any suitable configuration. For instance, the fastener 30 or a portion thereof may be threaded and may be configured as a stud, bolt, or the like. In FIG. 4 only some of the fasteners 30 that are hidden behind the differential carrier 42 are shown for clarity.

Referring primarily to FIG. 4, the second side wall 56 is disposed opposite the first side wall 54. The second side wall 56 may be disposed on a side of the axle housing 40 that is disposed proximate the bowl cover 58. For instance, the second side wall 56 may engage or contact the bowl cover 58. The second side wall 56 may define a second opening 90 through which a portion of the differential assembly 22 may extend. In at least one configuration, the second side wall 56 may be disposed substantially parallel to the first side wall 54. The term "substantially parallel" as used herein means the same as or very close to parallel and includes features or axes that are within ±3° of being parallel each other.

The bowl cover 58 is fixedly disposed on the second side wall 56. The bowl cover 58 may cover the second opening 90 and separate the interior of the axle housing 40 from the surrounding environment.

The mounting ring 60 may be fixedly disposed on the first side wall 54. In at least one configuration, the mounting ring 60 may encircle and partially define the first opening 80. The mounting ring 60 may reinforce the axle housing 40 and facilitate mounting of the differential carrier 42. For instance, the mounting ring 60 may have a carrier mounting surface 110. The carrier mounting surface 110 may face toward and may engage or contact the differential carrier 42. A set of fastener holes may be provided with the mounting ring 60. The fastener holes in the mounting ring 60 may be aligned with a corresponding member of the set of fastener holes 82 of the first side wall 54 and may be aligned with a corresponding fastener hole of the differential carrier 42. The aligned fastener holes may receive a fastener 30 that may couple the differential carrier 42 to the mounting ring 60 and the first side wall 54 of the axle housing 40. For instance, a fastener 30 may extend through a fastener hole 82 in the first side wall 54, a fastener hole in the mounting ring 60, and a fastener hole in the differential carrier 42. It is also contemplated that the mounting ring 60 may be omitted and the differential carrier 42 may contact and be directly mounted to the first side wall 54.

Referring to FIGS. 1 and 4, the differential carrier 42 is mounted to the center portion 50 of the axle housing 40. The differential carrier 42 may support the differential assembly 22, which is best shown in FIG. 2. In at least one configuration, the differential carrier 42 may have a flange portion 120 and at least one bearing support 122, which is best shown in FIG. 2.

The flange portion 120 facilitates mounting of the differential carrier 42 to the axle housing 40. For example, the flange portion 120 may be disposed proximate and may engage the carrier mounting surface 110 of the mounting ring 60 and may have a set of fastener holes that may receive fasteners 30 as previously discussed. As such, the differential carrier 42 may be mounted to the mounting ring 60 and the first side wall 54 of the axle housing 40.

Referring to FIG. 2, the bearing support 122 may receive a roller bearing assembly 124 that may rotatably support the differential assembly 22. In FIG. 2, two bearing supports 122 are shown that are located inside the center portion 50 proximate opposite sides of the differential assembly 22. A bearing support 122 may include a pair of legs that extend from the differential carrier 42. A bearing cap may be mounted to the legs and that may arch over a roller bearing assembly 124. The bearing support 122 and bearing cap may cooperate to extend around and secure the roller bearing assembly 124.

The differential assembly 22 may be disposed in the center portion 50 of the housing assembly 20. The differential assembly 22 may transmit torque to the vehicle traction wheel assemblies and permit the traction wheel assemblies to rotate at different velocities in a manner known by those skilled in the art. An input shaft 130 (which is best shown in FIG. 1) and a ring gear 132 (which is best shown in FIG. 2) of the differential assembly 22 are shown to facilitate an abbreviated discussion of the operation of the axle assembly 10 and the differential assembly 22.

The input shaft 130, if provided, may be operatively connected to a torque source. Alternatively, the input shaft 130 may be operatively connected to an output of another axle assembly. The input shaft 130 may be operatively connected to a drive pinion 134, which is shown in FIG. 2.

The drive pinion 134 may have teeth that mesh with teeth of the ring gear 132. The ring gear 132 may be fixedly mounted to a case of the differential assembly 22. Rotation of the drive pinion 134 may rotate the ring gear 132 and the case about a differential axis 136 and transmit torque between the case and a differential gear nest 138. The differential gear nest 138 may have pinion gears that mesh with side gears that are each mounted to a corresponding axle shaft 24. As such, the differential gear nest 138 may transmit torque between the ring gear 132 and the axle shafts 24.

The axle shafts 24 transmit between the differential assembly 22 and corresponding wheel hubs and wheels. In FIG. 2, two axle shafts 24 are provided such that each axle shaft 24 extends through a different arm cavity 70. The axle shafts 24 may extend along and may be rotatable about an axis, which may be the differential axis 136. Each axle shaft 24 may have a first end and a second end. The first end may be operatively connected to the differential assembly 22. The second end may be disposed opposite the first end and may be operatively connected to a wheel hub that may support a wheel. As shown in FIG. 1, an axle flange 140 may be disposed proximate the second end of the axle shaft 24 and may facilitate coupling of the axle shaft 24 to the wheel hub.

Referring to FIGS. 2 and 3, at least one dam 26 is disposed in the axle housing 40. The dam 26 may help capture or store a volume of lubricant 64 in the arm cavity 70 remotely from the sump portion 62. The dam 26 is fixedly disposed on the axle housing 40 and cooperates with the arm portion 52 to at least partially define a reservoir 100 as is best shown in FIG. 2. The reservoir 100 may be configured to store a volume of lubricant 64 in the arm portion 52. Storing lubricant 64 in the reservoir 100 may reduce the amount of lubricant 64 in the sump portion 62. Reducing the volume of lubricant 64 in the sump portion 62 may reduce churning losses or frictional drag that may be exerted upon the ring gear 132 by the lubricant 64 and may improve operating efficiency of the axle assembly 10 and vehicle fuel economy. In addition, lubricant 64 in the reservoir 100 may lubricate a roller bearing assembly that may rotatably support the axle shaft 24 and that may be located near the end of the arm portion 52 that is disposed opposite the center portion 50.

In the configuration shown, a dam 26 is associated with each arm portion 52. For convenience in reference, a dam 26 that is disposed in a first arm portion 52 may be referred to as a first dam 26 while the dam 26 that is disposed in a second arm portion 52 may be referred to as a second dam 26. The first dam 26 may cooperate with the first arm portion 52 to define a first reservoir 100 that may retain lubricant 64 in the first arm portion 52. Similarly, the second dam 26 may cooperate with the second arm portion 52 to define a second reservoir 100 that may retain lubricant 64 in the second arm portion 52. Each dam 26 may be completely disposed below an axle shaft 24 that extends through the arm portion 52.

Figure 5:
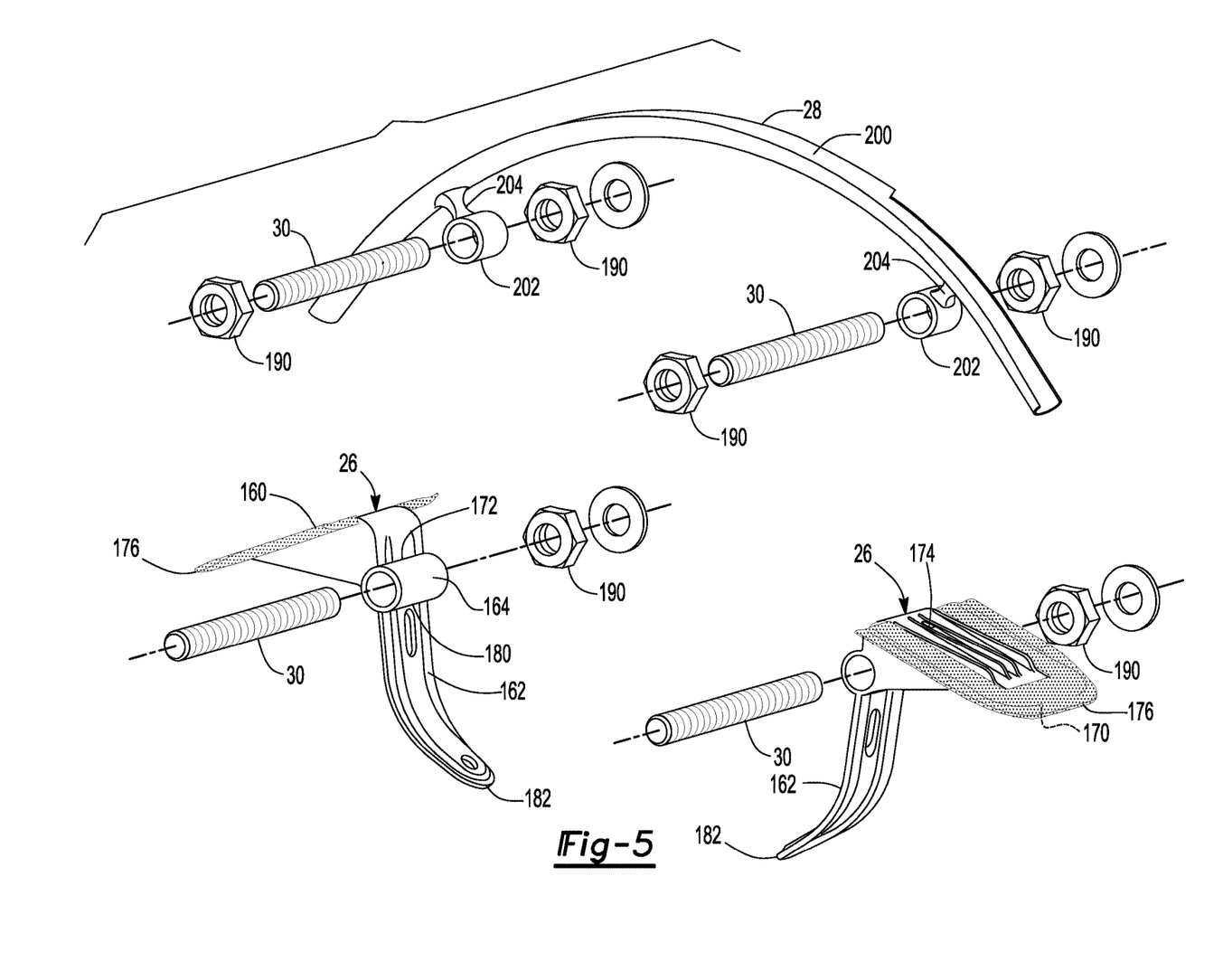
FIG. 5 is an exploded view that includes a lubricant conduit and dams of the axle assembly that are shown in FIG. 3 and associated mounting components.

Referring to primarily to FIGS. 3 and 5, an example of a dam 26 is shown. The dam 26 may include a dam panel 160, a brace 162, and a dam mounting feature 164.

The dam panel 160 may be at least partially received in an arm portion 52 and may extend from the arm portion 52. The dam panel 160 may partially define a corresponding reservoir 100. For instance, the dam panel 160 may extend upwardly from a bottom or bottom surface of the arm portion 52. The dam panel 160 may also extend between opposing lateral sides of the arm portion 52 that may extend upwardly from the bottom or bottom surface. The dam panel 160 may include a first dam panel end 170, a second dam panel end 172, an orifice 174, and a seal 176.

The first dam panel end 170 may be disposed proximate the bottom or bottom surface of the arm portion 52. The first dam panel end 170 may engage the bottom surface in configurations where the dam 26 is not provided with a seal 176.

The second dam panel end 172 may be disposed opposite the first dam panel end 170. The second dam panel end 172 may be disposed adjacent to the dam mounting feature 164. As is best shown in FIG. 3, the second dam panel end 172 may be disposed above the first dam panel end 170 and may be disposed in the center portion 50. Lubricant 64 that overtops the dam 26 may flow over the peak of the dam 26 and the second dam panel end 172 to return to the sump portion 62.

Referring to FIG. 5, one or more orifices 174 may be provided in the dam panel 160 to permit lubricant 64 to flow from a reservoir 100, through the orifice 174, and to the sump portion 62. The orifice 174 may be a through hole that may extend through the dam panel 160. The orifice 174 may be sized to control the rate at which lubricant 64 exits the reservoir 100 and returns to the sump portion 62. For example, the orifice 174 may be sized to provide a lubricant flow rate that is less than a fill rate (e.g., rate at which lubricant 64 is provided to the reservoir 100) at sufficiently high ring gear rotational speeds. As such, more lubricant 64 may be stored in a reservoir 100 at higher ring gear rotational speeds to reduce parasitic drag forces on the ring gear 132.

The seal 176, if provided, inhibit leakage between the dam panel 160 and the arm portion 52. The seal 176 may be made of any suitable material, such as a polymeric material or an elastomeric material such as rubber. As is best shown in FIG. 5, the seal 176 may extend around one or more sides of the dam panel 160 that may be disposed proximate the arm portion 52. For example, the seal 176 may extend around the bottom and left and right lateral sides of the dam panel 160.

Referring primarily to FIGS. 3 and 5, the brace 162 extends from the dam panel 160. The brace 162 may be received in or extend into the center portion 50 and may help support the dam panel 160. The brace 162 may include a first brace panel end 180 and a second brace panel end 182.

The first brace panel end 180 may extend from the dam mounting feature 164. As such, the first brace panel end 180 may be disposed proximate the top of the brace 162 and may be located above the sump portion 62.

Referring to FIG. 3, the second brace panel end 182 may be disposed opposite the first brace panel end 180. The second brace panel end 182 may be disposed in the sump portion 62 and may be disposed proximate or may engage the bottom of the center portion 50. The second brace panel end 182 of the first dam 26 may be spaced apart from and may not engage the second brace panel end 182 of the second dam 26. As such, the brace 162 may terminate in the sump portion 62 and may not extend completely across the bottom of the center portion 50.

The dam mounting feature 164 facilitates mounting of the dam 26 to the axle housing 40. The dam mounting feature 164 is fixedly positioned with respect to the dam 160 and the brace 162. In the configuration shown, the dam mounting feature 164 is disposed between the second dam panel end 172 and the first brace panel end 180. The dam mounting feature 164 may have a hollow tubular configuration that may encircle the fastener 30. As such, the dam 26 may be mounted to a fastener 30, and the fastener 30 may extend from and may be mounted to the axle housing 40 and the differential carrier 42, thereby securing the dam 26 to the axle housing 40. As is best shown in FIG. 4, the dam mounting feature 164 may be spaced apart from the axle housing 40. In addition, the fastener 30 that secures the dam 26 may extend toward but may be spaced apart from the second side wall 56 of the axle housing 40. As is best shown in FIG. 5, the dam mounting feature 164 may be spaced apart from the portion of the dam panel 160 that helps define the reservoir 100.

Referring to FIGS. 4 and 5, a nut 190 may be disposed on the fastener 30 that extends through the dam mounting feature 164. The nut 190 may engage the first side wall 54 to help secure the fastener 30 to the axle housing 40. For instance, the nut 190 may inhibit removal of the fastener 30 from the axle housing 40 or movement of the fastener 30 to the right from the perspective shown in FIG. 4. The nut 190 may be spaced apart from the dam 26.

Referring primarily to FIGS. 2, 3, and 5, a lubricant conduit 28 may be provided to direct lubricant 64 to one or more reservoirs 100. For instance, the lubricant conduit 28 may be configured to receive or capture lubricant 64 that is dispersed inside the axle housing 40 by the differential assembly 22, drive pinion 134, or another rotating component. The lubricant conduit 28 may be spaced apart from the ring gear 132 so as to not interfere with rotation of the ring gear 132 or strip the lubricant 64 from the ring gear surfaces.

The lubricant conduit 28 may have any suitable configuration. For instance, the lubricant conduit 28 or a portion thereof may be configured as a groove, tube, hose, pipe, or channel that may have a passage or recess that may receive lubricant 64 that is dispersed by the differential assembly 22 or that drips from an interior surface of the center portion 50 into the lubricant conduit 28. The lubricant conduit 28 may be provided as a separate component from the axle housing 40 that may be coupled to the axle housing 40 via a fastener 30 as will be discussed in more detail below. In addition, the lubricant conduit 28 may be a unitary one-piece component. In the configuration shown, the lubricant conduit 28 is concave and open in a direction that faces away from the differential assembly 22 and toward the top of the axle housing 40 to help capture lubricant droplets as they fall. The lubricant conduit 28 or a portion thereof may slope downwardly from the center portion 50 of the axle housing 40 toward an arm portion 52 to facilitate the flow of lubricant 64 over the dam 26 and into the arm portion 52 and a corresponding reservoir 100. Flow of lubricant into a reservoir is represented by the straight arrowed lines near the ends of the lubricant conduit 28 in FIG. 2. The lubricant conduit 28 may route the lubricant 64 to a single reservoir 100 or multiple reservoirs 100 depending on its configuration.

As is best shown in FIG. 4, the lubricant conduit 28 may be positioned closer to the first side wall 54 than the brace 162 of the dam 26 is positioned to the first side wall 54. In at least one configuration and as is best shown in FIGS. 4 and 5, the lubricant conduit 28 may have a trough 200, a conduit mounting feature 202, a stem 204, or combinations thereof.

The trough 200 receives lubricant 64 and direct lubricant 64 to the arm portion 52. The trough 200 is concave in the configuration shown.

The conduit mounting feature 202 facilitates mounting of the lubricant conduit 28 to the axle housing 40. The conduit mounting feature 202 may be disposed below the trough 200 and may be fixedly disposed or fixedly positioned with respect to the trough 200. In the configuration shown, two conduit mounting features 202 are provided that are spaced apart from each other and configured to receive different fasteners 30. The conduit mounting feature 202 may have a hollow tubular configuration that may encircle and engage the corresponding fastener 30. As such, the lubricant conduit 28 may be mounted to a fastener 30, and the fastener 30 may extend from and may be mounted to the axle housing 40 and the differential carrier 42, thereby securing the lubricant conduit 28 to the axle housing 40. As is best shown in FIG. 4, the conduit mounting feature 202 may be spaced apart from the axle housing 40. In addition, the fastener 30 that secures the lubricant conduit 28 may extend from the first side wall 54 toward the second side wall 56 of the axle housing 40 and may be spaced apart from the second side wall 56 of the axle housing 40. As is best shown in FIG. 5, the conduit mounting feature 202 may be spaced apart from the trough 200.

Referring to FIG. 5, the stem 204 may extend from the trough 200 to the conduit mounting feature 202. In such a configuration, the trough 200 may be spaced apart from the conduit mounting feature 202. It is contemplated that the stem 204 may be omitted and the trough 200 may contact the conduit mounting feature 202.

Referring to FIGS. 4 and 5, one or more nuts 190 may be disposed on the fastener 30 that extends through the conduit mounting feature 202. In the configuration shown, two nuts 190 are illustrated. A first nut 190 may engage the first side wall 54 to help secure the fastener 30 to the axle housing 40. For instance, the first nut 190 may inhibit removal of the fastener 30 from the axle housing 40 or movement of the fastener 30 to the right from the perspective shown in FIG. 4. The nut 190 may also engage the conduit mounting feature 202. For instance, the first nut 190 may extend between the conduit mounting feature 202 and the first side wall 54.

A second nut 190 may be disposed on an opposite side of the conduit mounting feature 202 from the first nut 190. The second nut 190 may engage the conduit mounting feature 202 and inhibit movement of the lubricant conduit 28 with respect to the fastener 30. For instance, the second nut 190 may inhibit removal of the lubricant conduit 28 from the fastener 30 or movement to the left from the perspective shown in FIG. 4.

Referring to FIG. 4, the fasteners 30 that extends through the dam mounting feature 164 and the conduit mounting feature 202 may each have an end that is disposed inside the axle housing 40. The end of the fastener that extends through the conduit mounting feature 202 may be spaced apart from the second side wall 56 and may be disposed further from the second side wall 56 than the end of the fastener 30 that extends through the dam mounting feature 164.

The present invention may allow a dam and a lubricant conduit to be mounted to the axle housing without welding. Welding of a dam or a lubricant is difficult due to the limited space available and requires additional tooling to hold the dam and lubricant conduit during welding and clean surfaces to provide a suitable weld. As such, attachment without welding may reduce assembly time and associated costs. The present invention also allows an axle assembly to be retrofitted to add a dam and a conduit. A dam and a conduit may be added to an axle assembly using fastener holes that may already be provided with the axle housing and differential carrier in conjunction with fasteners that extend into the axle housing to a dam or conduit. As such, a dam and a conduit may be mounted without providing new fastener holes or fastener mounting locations, thereby reducing installation time and associated costs.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
a housing assembly that includes an axle housing having a center portion and an arm portion that extends from the center portion, wherein the arm portion is adapted to receive an axle shaft;
a dam that is disposed in the axle housing and that cooperates with the arm portion to define a reservoir that retains lubricant in the arm portion, wherein the dam has a dam panel that extends from the arm portion, a brace that extends from the dam panel into the center portion, and a dam mounting feature that is fixedly disposed on the brace; and
a first fastener that extends from the axle housing and engages the dam mounting feature to secure the dam to the axle housing.

2. The axle assembly of claim 1 wherein the housing assembly includes a differential carrier upon which a differential assembly is rotatably disposed, wherein the differential carrier is mounted to the axle housing with the first fastener.

3. The axle assembly of claim 2 wherein the axle housing has a first side wall that defines a first opening through which the differential assembly extends, a second side wall that is disposed opposite the first side wall and that defines a second opening, and a bowl cover that is fixedly disposed on the second side wall and that covers the second opening, wherein the first fastener extends from the first side wall and is spaced apart from the second side wall.

4. The axle assembly of claim 3 wherein a nut is disposed on the first fastener and engages the first side wall to inhibit removal of the first fastener from the axle housing, wherein the nut is spaced apart from the dam.

5. The axle assembly of claim 3 wherein the axle housing has a mounting ring that is fixedly disposed on the first side wall and that partially defines the first opening, wherein the first fastener extends through a fastener hole in the first side wall and through a fastener hole in the mounting ring.

6. The axle assembly of claim 1 wherein the dam mounting feature encircles the first fastener.

7. The axle assembly of claim 1 wherein the dam mounting feature is spaced apart from the dam panel.

8. The axle assembly of claim 1 wherein the dam mounting feature is spaced apart from the axle housing.

9. The axle assembly of claim 1 wherein the housing assembly includes a differential carrier upon which a differential assembly is rotatably disposed, the differential assembly is disposed in the center portion of the axle housing and has a ring gear, the center portion has a sump portion that receives lubricant, and the axle assembly includes a lubricant conduit that captures lubricant that is dispersed by the ring gear.

10. The axle assembly of claim 9 wherein the axle housing includes a first side wall that defines a first opening through which the differential assembly extends, and wherein the lubricant conduit is positioned closer to the first side wall than the brace of the dam is positioned to the first side wall.

11. The axle assembly of claim 9 wherein the lubricant conduit has a trough that directs lubricant to the arm portion and a conduit mounting feature that is disposed proximate the trough, and wherein a second fastener extends from the axle housing and engages the conduit mounting feature to mount the lubricant conduit to the axle housing.

12. The axle assembly of claim 11 wherein the differential carrier is mounted to the second fastener.

13. The axle assembly of claim 11 wherein the conduit mounting feature encircles the second fastener.

14. The axle assembly of claim 11 wherein a stem extends from the conduit mounting feature to the trough.

15. The axle assembly of claim 11 wherein the second fastener extends from a first side wall toward a second side wall of the axle housing and is spaced apart from the second side wall.

16. The axle assembly of claim 11 wherein the first fastener and the second fastener each have an end that is disposed inside the axle housing and the end of the second fastener is disposed further from a second side wall of the axle housing than the end of the first fastener is disposed from the second side wall.

17. The axle assembly of claim 11 wherein a first nut is disposed on the second fastener and inhibits movement of the second fastener with respect to the axle housing.

18. The axle assembly of claim 17 wherein the first nut engages the conduit mounting feature.

19. The axle assembly of claim 17 wherein the first nut extends between the conduit mounting feature and a first side wall of the axle housing.

20. The axle assembly of claim 17 wherein a second nut is disposed on the second fastener and is disposed on an opposite side of the conduit mounting feature from the first nut, wherein the second nut engages the conduit mounting feature and inhibits movement of the lubricant conduit with respect to the second fastener.

* * * * *